REMOTE METER READING SYSTEM

Filed Nov. 29, 1961 4 Sheets-Sheet 1

OPTICAL PATH

INVENTORS D. M. CHAPIN
N. D. NEWBY
BY E. J. Ohlinder
ATTORNEY

March 26, 1963 D. M. CHAPIN ET AL 3,083,357

REMOTE METER READING SYSTEM

Filed Nov. 29, 1961 4 Sheets-Sheet 2

INVENTORS D. M. CHAPIN
N. D. NEWBY
BY E. J. Snider
ATTORNEY

INVENTORS D. M. CHAPIN
N. D. NEWBY
BY E. J. Olinder
ATTORNEY

March 26, 1963 D. M. CHAPIN ETAL 3,083,357

REMOTE METER READING SYSTEM

Filed Nov. 29, 1961 4 Sheets-Sheet 4

RECORDER PLOT

INVENTORS D. M. CHAPIN
N. D. NEWBY
BY E. J. Kluider
ATTORNEY

United States Patent Office 3,083,357
Patented Mar. 26, 1963

3,083,357
REMOTE METER READING SYSTEM

Daryl M. Chapin, Basking Ridge, and Neal D. Newby, Leonia, N.J., assignors to Bell Telephone Laboratories, Incorporated, New York, N.Y., a corporation of New York Filed Nov. 29, 1961, Ser. No. 155,753
15 Claims. (Cl. 340—204)

This invention relates to telemetering systems and more particularly to systems for reading a meter from a remote station. Its principal object is to facilitate the remote reading of utility type meters over telephone lines.

Various attempts have been made in the past to devise a system for reading utility meters at a telephone subscriber's premises from a telephone central office or other control point. In general, such arrangements provide for the translation of the meter reading into an electrical signal and for the transmission of the signal over telephone lines. The potential advantages of such a system which include both speed and economy are obviously significant. Moreover, such a system may also provide the core for fully integrated meter reading, recording and billing arrangements. Although systems of this type are known to be technically feasible there have as yet been no steps taken toward actual commercial realization.

Prior art systems designed for the remote reading of utility meters have failed in one way or another to provide the potential advantages indicated above. For example, those systems requiring direct electrical connections to conventional meters, particularly electric power meters, are generally unsuitable because of interference with the electrical circuit of the meters. A major change in the design of the meter or the installation of a different type of meter is required to solve the problem. Other systems employ direct mechanical connections which overload the meter, reducing meter accuracy and increasing mechanical complexity. Although this problem may also be solved by the employment of specifically designed meters, or modified conventional meters, the attendant increase in the cost of the installation is prohibitive. Even indirect electrical connections to an existing meter, as by capacitive or inductive coupling, for example, cannot be resorted to under certain circumstances because of local electrical interference.

Accordingly, a specific object of the invention is to reduce both cost and complexity in remote meter reading systems.

Another object of the invention is to avoid extensive modifications to substantially conventional meters when employed in such systems.

These and other objects are attained in accordance with the principles of the invention by a system employing optical scanning of binary code wheels mounted on the shafts of a utility meter such as a gas meter, for example, which may be located at a telephone subscriber's premises. One illustrative system utilizes three code wheels for the hundreds, tens and units digit, respectively, of a single meter reading. The face of each code wheel bears binary information in a pattern of black and white concentric, arcuate areas. Although two of the wheels substantially overlap the third, a sufficient code pattern is uncovered to permit the derivation of an electrical signal in binary form which is indicative of the rotational position of all of the code wheels. The derivation is accomplished by a light responsive circuit that is activated by the light reflected from the wheels as the binary code pattern is swept by a relatively narrow beam of light in a single substantially circular scan.

Specifically, the principles of the invention call for the utilization of the varied pattern of reflected light to control the resistance of a photoresistive element in the emitter circuit of a gating or modulating transistor. The resulting On or Off bias thus applied to the transistor determines the modulation that is applied to the broad spectrum electrical noise generated by the scanning motor. The electrical noise from the motor, modulated as described in binary code form, is then applied to the telephone subscriber's loop for transmission to the central office or control point. In effect, in accordance with the principles of the invention, the electrical noise in a motor driven scanning system, rather than constituting an undesirable source of electrical interference, is turned to account as an intelligence carrier.

Accordingly, a feature of the invention is the combination of a motor driven optical scanning system with a gating circuit that modulates the electrical noise from the motor to form electrical signals indicative of the information derived by the scanning system, the modulated noise being employed as an outgoing information signal.

Another feature of the invention is a transistor gating circuit actuated by light signals from an optical scanning system applied to a photoresistive element in the emitter circuit of the transistor.

A further feature of the invention is a plurality of overlapping opaque code wheels divided into light reflective and nonreflective areas, the wheels and areas thereof being so interrelated that a binary signal in the form of reflected light indicative of the angular position of rotation of all of the wheels is generated by scanning the wheels with a single circular sweep of a relatively narrow light beam.

The principles of the invention together with additional objects and features thereof will be fully apprehended from the following detailed description and accompanying drawing of an illustrative embodiment. In the drawing.

Figure 1:
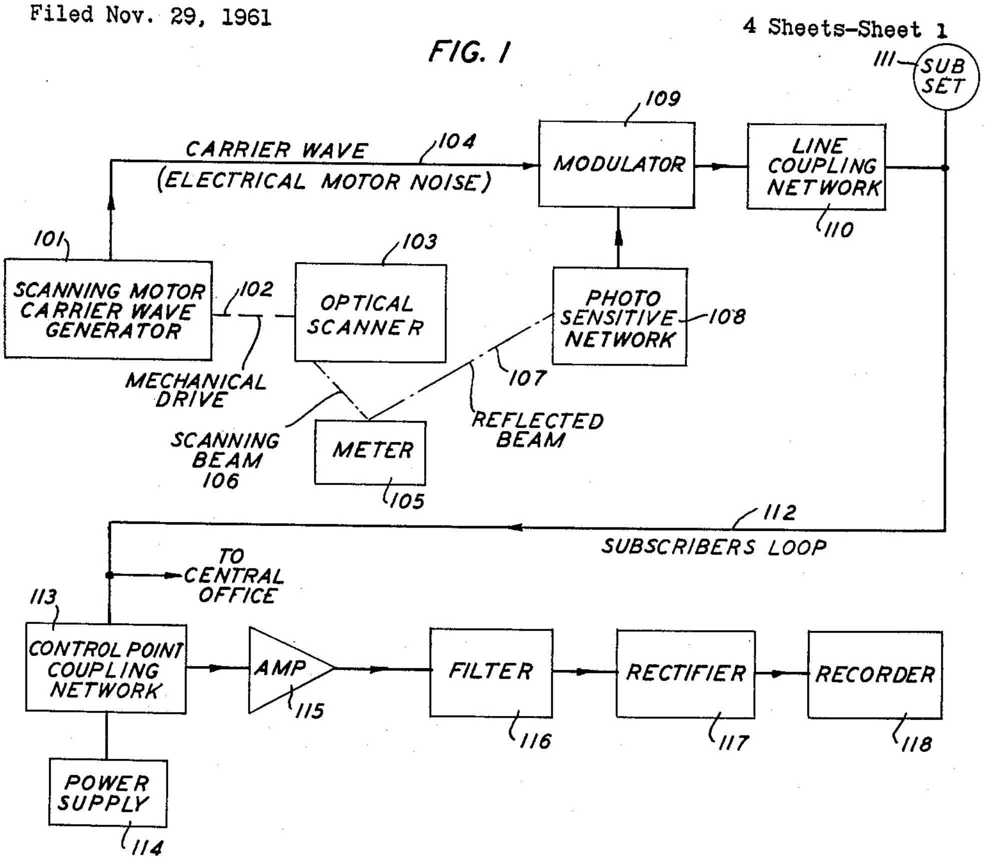
FIG. 1 is a block diagram of an illustrative meter reading system in accordance with the invention.
Figure 2:
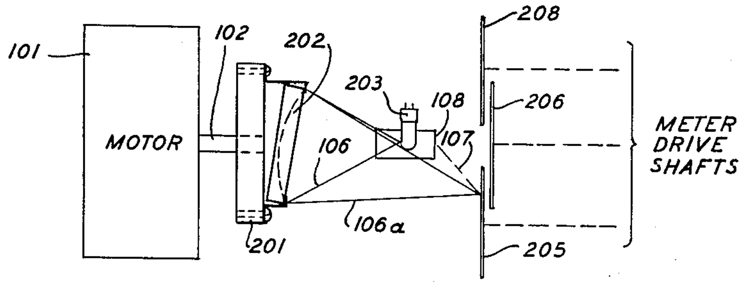
FIG. 2 is a sketch of the optical scanner shown in block form in FIG. 1.
Figure 4:
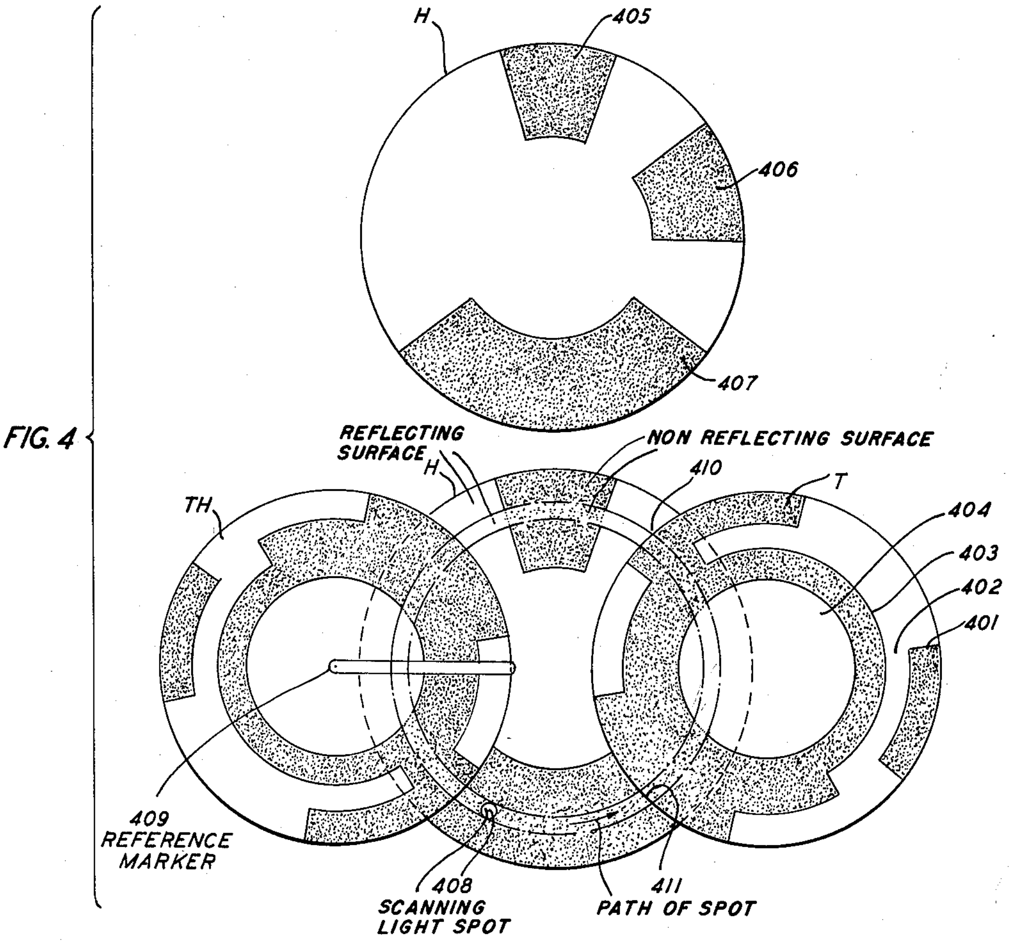
FIG. 4 is a plan view of an illustrative set of code disks.

In the illustrative embodiment of the invention shown in FIG. 1, although the equipment designated Subscriber Station Equipment is shown located at a telephone subscriber's premises, any other location which provides adequate transmission facilities would be equally suitable. The meter 105 is intended to represent any conventional utility meter such as an electric meter or gas meter, for example, modified as indicated in FIGS. 2 and 4 in accordance with the principles of the invention. Apparatus labeled Control Point Equipment may be located at a telephone central office but more typically would be located at a so-called Control Point which might be the business office of a local utility company, for example.

To initiate the generation of an electrical signal indicative of the reading of meter 105, a D.-C. voltage from power supply 114 is applied by way of a control point coupling network 113 to the subscriber's loop 112. The polarity of the power supply 114 is opposite to that of the normal central office power supply. This reversal in polarity is recognized by the line coupling network 110 and power is coupled through this network to a conducting path, shown in detail in FIG. 3, to operate the scanning motor and carrier wave generator 101. Direct mechanical drive for the optical scanner 103 is provided through a mechanical coupling 102. In accordance with the invention, the scanning motor 101 performs a dual function in that the electrical noise that it generates, which noise is of the form typically generated by any conventional electric motor, is employed as a carrier wave and is applied to a modulator 109 by way of a conducting path 104. With the optical scanner 103 in operation, a narrow scanning light beam 106 is caused to sweep the face of the meter 105 in a substantially circular path. The angular displacement of the meter shafts determines the position of a set of opaque code wheels or disks, shown in detail in FIGS. 2 and 4, having binary information on the faces thereof in terms of uniquely defined areas of relatively high and relatively low light reflectivity. Consequently, the reflected beam 107 is of an intensity which varies in binary fashion in correspondence with the parts of the code wheels that are swept by the scanning beam 106. The output of the photosensitive network 108, which is determined by the varying intensity of reflected beam 107 is applied to modulator 109. As a result, the output of modulator 109 consists of a carrier wave which is modulated in amplitude in a fashion which is indicative of the physical position of the code wheels on the meter.

The carrier wave, as modulated, is then applied through the line coupling network 110 to the control point equipment by way of the subscriber's loop 112. From the control point coupling network 113 the signal is amplified by amplifier 115 and undesirable low frequency components of the electrical noise spectrum are filtered by filter 116. The resulting signal is then rectified by rectifier 117 and the output, consisting of a train of suitably spaced and suitably proportioned pulses, is applied to a recorder 118. It is to be understood that within the scope of the invention the final output signal may be applied to any of a variety of recorders which may comprise any suitable equipment designed to translate the incoming signals into some form of meter reading record. Illustrative of such equipment is a conventional strip recorder in which incoming signals are employed to control the movements of a recording stylus or pen on a recording sheet which is advanced at a uniform rate. Alternatively, the output signals may be employed to initiate the operation of more complex equipment such as automatic printers for example, which might be utilized as a part of an automatic billing system.

Certain mechanical details of the optical scanner 103 are shown in FIG. 2. Specifically, the motor 101 is shown driving a mounting member 201 by way of a mechanical coupling 102. A suitably tilted spherical mirror 202 is positioned in fixed relation to and driven by the mounting member 201. A light source or lamp 203 is imaged on the mirror 202 by the direct beam 106 which is in turn focussed by beam 106A as a light spot on one of the code wheels 205. As the mirror 202 rotates, the light spot scans code wheels 205, 206, and 208 in a circular path. In FIG. 4 it is evident that for various positions of the code wheels TH, H, and T, there must necessarily be a unique pattern of reflected light. FIG. 2 shows a portion of reflected light from code wheel 205 impinging on photoresistor 108. Additionally, FIG. 2 shows that each of the code wheels 205, 206, and 208 is driven by a respective one of the meter shafts 209, 210, and 211.

Figure 3:
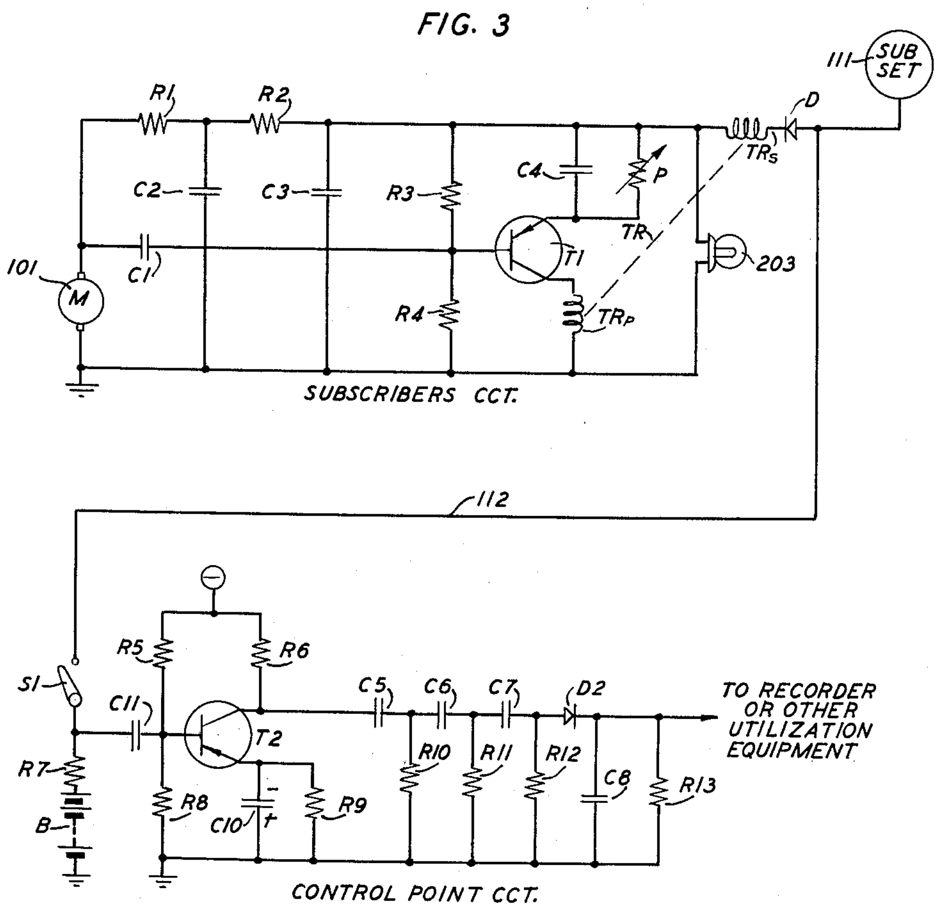
FIG. 3 is a schematic circuit diagram of the equipment shown in block form in FIG. 1.

Details of the electrical circuitry of the illustrative embodiment are shown in FIG. 3. There it may be seen that to initiate a reading, power is applied to the subscriber's loop 112 by way of resistor R7 by closing switch S1. Diode D is suitably poled with respect to the operating voltage so that power is applied to light the lamp 203 and to drive the motor 101. A filtering network consisting of resistors R1 and R2 and capacitors C2 and C3 prevents the motor noise carrier wave from reaching line 112 directly. Instead, the motor noise carrier wave is applied directly to the base of transistor T1 by way of coupling capacitor C1. Resistors R3 and R4 provide the proper bias voltage for the base of transistor T1 as it performs its function as a modulator.

In accordance with the invention, the photo-responsive network includes a photoresistor P which is bridged between the emitter of transistor T1 and one terminal of the secondary winding TR*s* of transformer TR. The photoresistor P is, in effect, a variable biasing resistor and capacitor C4 performs the conventional signal bypass function. A light-beam source for the scanning mechanism is provided by a lamp 203 which is bridged across the line. The output of transistor T1 which appears at its collector electrode is, in turn, applied to the subscriber's loop 112 by way of transformer TR which consists of a primary winding TR*p* and a secondary winding TR*s*.

In the operation of the modulator circuit, consisting of transistor T1 and its associated circuit components, there is in fact a net loss of signal through the transistor. Nevertheless, changes in the biasing voltage as produced by photoresistor P produce relatively large changes in transistor gain. In one illustrative circuit relatively small changes in light intensity produced a change in gain of 20 db and up to 60 db change in gain resulted from extreme changes in light. In the same embodiment extreme changes in temperature from −30 degrees C. to +50 degrees C. produced very little change in gain. The evident stability of the circuit affords the circuit designer with considerable latitude in the selection of the key circuit components. The combination of a conventional commercial 2N1128 transistor and a Clairex photoresistor, for example, is adequate to perform the functions indicated.

With switch S1 still closed, the modulated output signal is applied to the control point circuit by way of a coupling capacitor C11 and thence to the base of an amplifying transistor T2. Biasing resistors for the transistor circuit include resistors R5, R6, R8, and R9. A signal by-pass for resistor R9 is provided by capacitor C10. The amplified output is taken from the collector of transistor T2, and is filtered to remove undesirable low frequency components by the filter network consisting of capacitors C5, C6, and C7, and resistors R10, R11, and R12. The filtered signal is then rectified by diode D2 and the rectified output, smoothed by a filter consisting of capacitor C8 and resistor R13, is applied to a suitable recorder or other utilization equipment.

A fuller understanding of the operation and function of the code wheels will be gained by considering FIG. 4 which is a detailed sketch of an illustrative set of code wheels, conforming to the principles of the invention. The particular code illustrated is designed to operate with a three disk set, as shown. The rotary position of the disk TH on the left may, for example, indicate a thousands digit, the position of the center disk H may indicate a hundreds digit, and the position of the disk T on the right may represent a tens digit. In any event, a full revolution by disk TH is accompanied by ten revolutions of disk H and by 100 revolutions of disk T. Consequently, the rotary position of the disks may represent any desired combination of digits conforming to the proportions indicated.

It is apparent that the scanning spot 408 travels circumferentially over the center disk H and radially over at least part of the two outer disks TH and T. The parameters of disk sizes, disk positions and spot path are selected in accordance with the principles of the invention so that the point of departure of the scanning spot from either of the outer disks, point 410 for example, is 90 degrees from the point of entry of the scanning spot on the same disk, point 411 for example. The coding of the two outer disks TH and T is identical and consists of a first or outer ring 401 which includes a number of alternating black and white arcuate, adjacent areas. A similar second code ring 402 is spaced inside the first code ring. Additionally, an inner black ring 403 is employed as a reference or guard ring. In scanning either of the outer disks the light spot crosses each of the two outer or code rings 401 and 402 twice, once going in and again going out, and, accordingly, a four digit binary code representing sixteen positions is possible. The resulting code is a so-called "Gray Code" in which each successive binary reading differs from adjacent readings by one digit only.

With a four digit code representing sixteen positions, the maximum uncertainty of reading becomes only one-sixteenth of a revolution. In the case of the right-hand disk T, this uncertainty is allowed to stand in the same way that a certain degree of uncertainty necessarily exists in the visual reading of the terminal pointer in any three pointer meter system. In the case of the left-hand disk TH, the uncertainty can be removed by comparison with the center disk readings.

The center disk H is also shown separately since part of it is obscured in the combined position. In the four-digit code of the outer disks the reading sequence begins as the light moving counterclockwise enters the outer ring 401, as at point 411, and ends as the light leaves the outer circle as at point 410. For the center disk the top sectors are read first and the lower sectors added to them after the left-hand code is read. The following code with its decimal equivalents applies to the outer disks TH and T:

*Code Table for Outer Disks*

| 4 Digit Code | Fraction of Rotation (Quantized) | Nominal Spread | Interpretation using Next Lower Decade Reading | |
|---|---|---|---|---|
| | | | Correct Reading | Next Lower Decade Reading |
| 0000 | 0, 1 | −1/32 to +1/32 | 9<br>0 | 5 through 9<br>0 through 4 |
| 0001 | 1/16 | 1/32 to 3/32 | 0<br>1 | 1 through 9<br>0 |
| 1001 | 2/16 | 3/32 to 5/32 | 0<br>1 | 8 through 9<br>0 through 6 |
| 1000 | 3/16 | 5/32 to 7/32 | 1<br>2 | 4 through 9<br>0 through 3 |
| 1100 | 4/16 | 7/32 to 9/32 | 2 | 0 through 9 |
| 0100 | 5/16 | 9/32 to 11/32 | 2<br>3 | 6 through 9<br>0 through 5 |
| 0101 | 6/16 | 11/32 to 13/32 | 3<br>4 | 3 through 9<br>0 through 1 |
| 1101 | 7/16 | 13/32 to 15/32 | 3<br>4 | 9<br>0 through 8 |
| 1111 | 8/16 | 15/32 to 17/32 | 4<br>5 | 5 through 9<br>0 through 4 |
| 1110 | 9/16 | 17/32 to 19/32 | 5<br>6 | 1 through 9<br>0 |
| 0110 | 13/16 | 19/32 to 21/32 | 5<br>6 | 8 through 9<br>0 through 6 |
| 0111 | 11/16 | 21/32 to 23/32 | 6<br>7 | 4 through 9<br>0 through 3 |
| 0011 | 12/16 | 23/32 to 25/32 | 7 | 0 through 9 |
| 1011 | 13/16 | 25/32 to 27/32 | 7<br>8 | 6 through 9<br>0 through 5 |
| 1010 | 14/16 | 27/32 to 29/32 | 8<br>9 | 3 through 9<br>0 through 1 |
| 0010 | 15/16 | 29/32 to 31/32 | 8<br>9 | 9<br>0 through 8 |

Limitations and requirements of the center disk necessitate a somewhat different code. As shown, the coding of the center disk H consists of a single outer ring which includes three black arcuate sections 405, 406, and 407, and intermediate white sections. With the indicated parameters selected, the light spot travels the upper and lower regions for about 72 degrees each. If the disk is divided into ten equal sections (36 degrees each), it follows that two sectors are visible above and below which allows for a four-digit code. Of the sixteen numbers represented by four-digit coding, it can readily be seen that four, namely, 0000, 1111, 0101 and 1010, are unusable for the reason that these codes are repeated at 180 degree intervals and are therefore ambiguous. Two other possible combinations were dropped to leave a remainder of ten codes. In the case of the center disk there is no concern with ambiguity from the possible straddling of two codes inasmuch as the readings of the right-hand disk T indicate where to read the center code to avoid straddling. The binary code readings and decimal equivalents therefore applicable to the center code disk H are as indicated in the following table.

*Code Table for Center Disk*

| Digit: | Binary equivalents |
|---|---|
| 0 | 1000 |
| 1 | 0110 |
| 2 | 1011 |
| 3 | 0111 |
| 4 | 0001 |
| 5 | 0010 |
| 6 | 1001 |
| 7 | 1110 |
| 8 | 1101 |
| 9 | 0100 |

If light reflected from a black area is arbitrarily assigned a "0" binary designation and from a white area a "1" binary designation the binary reading of the three code wheels shown in FIG. 4, reading from left to right is 0000, 1000 and 0000. Translating from the two tables above gives a decimal digit reading of 000.

An additional feature of the code wheel array shown in FIG. 4 is the reference marker 409 which remains in a fixed position with respect to the code wheels. Reference marker 409 is designed, in accordance with the invention, to be highly reflective and may be constructed of any suitable material, chromium plated steel for example, that has a mirror-like finish. Light reflected from reference marker 409 has a greater intensity than light reflected from a white area and as a result the corresponding electrical signal is readily identifiable and serves as a convenient reference point in translating a train of binary signals.

Figure 5:
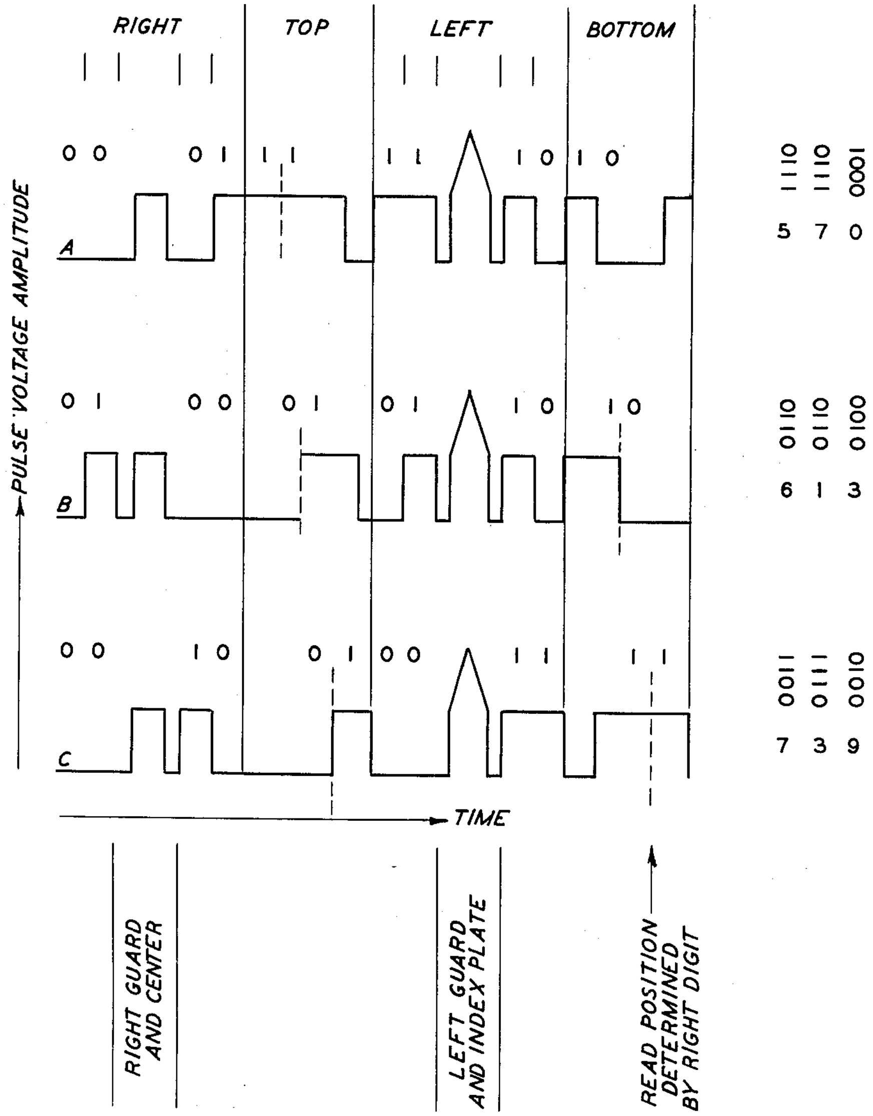
FIG. 5 is a plot of illustrative output waveforms.

FIG. 5 shows an illustrative series of plots from a strip recorder to which typical groups of output signals have been applied from an invention embodiment such as that disclosed by FIGS. 1, 2, 3, and 4. Outputs designated Right and Left are from the T and TH code wheels, respectively, and outputs designated Top and Bottom are from the top and bottom of the center or H code wheel. The peaked pulse found in each of the signal groups in the Left column is illustrative of the return from the reference marker 409 shown in FIG. 4.

Reading the top or A plot in the manner indicated shows the binary combination to be 1110, 1110, 0001 and translating from the two tables presented above gives a numerical equivalent of 570. Similarly, the binary reading of 0110, 0110, 0100 shown in plot B may be translated to 613 and the binary reading 0011, 0111, 0010 of plot C is equivalent to 739.

The above-described embodiment is illustrative of the application of the principles of the invention. Numerous other arrangements may be designed by those skilled in the art without departing from the spirit and scope of the invention.

What is claimed is:

1. In a telemetering system apparatus for translating the angle of rotation of each of a plurality of shafts into an electrical signal comprising, in combination, a plurality of disk members each having a surface divided into areas of relatively high and relatively low light reflectivity, each of said disks being mounted in fixed axial relation for rotation by a respective one of said shafts, a light beam source, means for scanning the surface of each of said disks with said beam thereby to generate a pattern of reflected light varying in intensity in accordance with said areas and hence in accordance with the angle of rotation of each of said shafts, and means responsive to said reflected light for generating an electrical signal of correspondingly varying magnitude.

2. Apparatus in accordance with claim 1 wherein said scanning means includes a motor for driving said light beam in a preassigned scanning pattern over said surfaces, said motor, when operating, generating a relatively broad spectrum of electrical noise, and means for modulating said noise with said electrical signal thereby to constitute a modulated carrier wave signal indicative of the angle of rotation of each of said shafts.

3. Apparatus in accordance with claim 2 wherein said moduating means includes a transistor having a base, an emitter and a collector electrode and wherein said generating means includes a photoresistive element in the emitter circuit of said transistor in further combination with means connecting said motor between said base and collector electrodes.

4. In a telemetering system means for translating the angle of rotation of each of a plurality of shafts into an electrical signal comprising, in combination, a plurality of disk members each mounted in fixed axial relation for rotation by a respective one of said shafts, each of said disk members having an opaque surface bearing binary information in terms of concentric, arcuate, adjacent areas of relatively high and relatively low light reflectivity, the particular sequence and relative extent of said areas as viewed from a preselected reference point being indicative of the angle of rotation of said shafts, the relative position of said shafts and the size of said disk members being such that at least two of said disks substantially overlap a third one of said disks, means for scanning said disks with a relatively narrow light beam in a single substantially circular scanning sweep thereby to generate a pattern of reflected light corresponding to the position and pattern of said disks, and means for translating said reflected light into a corresponding electrical signal.

5. Apparatus in accordance with claim 4 wherein said scanning means includes a motor for rotating said light beam in a preassigned scanning pattern over said surfaces, said motor, when operating, generating a relatively broad spectrum of electrical noise, and means for modulating said noise with said electrical signal, thereby to constitute a modulated carrier wave signal indicative to the angle of rotation of each of said shafts.

6. Apparatus for translating the angle of rotation of each of three meter driven shafts into an electrical signal indicative of the angle of rotation of said shafts and hence indicative of the reading of said meter comprising, in combination, three opaque disk members each mounted for rotation by a respective one of said shafts, the relative position of said shafts and the size of said disk members being such that two of said disks substantially overlap a third one of said disks, each of said disk members having a surface bearing binary information in terms of concentric, arcuate, adjacent areas of relatively high and relatively low light reflectivity, the particular sequence and relative extent of said areas in relation to a fixed preselected, relatively narrow intersecting path being indicative of the reading of said meter, a light beam source, means for scanning the combined nonoverlapped and overlapping portions of said areas with said beam along said preselected path, thereby to generate a distinctive pattern of reflected light varying in intensity in digital fashion to form a train of signals indicative of the reading of said meter, and means responsive to said reflected light for generating a corresponding train of electrical signals.

7. Apparatus in accordance with claim 6 wherein said scanning means includes dual function electric motor means for driving said scanning means and for generating a carrier wave in the form of electrical motor noise, and means for modulating said carrier wave with said electrical signals, thereby to constitute an information signal suitable for transmission.

8. Apparatus in accordance with claim 7 wherein said modulating means includes a transistor having a base, emitter and collector electrodes and wherein said generating means includes a photoresistive element in the emitter circuit of said transistor in further combination with means connecting said motor between said base and collector electrodes.

9. In a telemetering system apparatus for translating the angle of rotation of each of three meter driven shafts into an electrical signal indicative of the angle of rotation of said shafts and hence indicative of the reading of said meter comprising, in combination, three opaque disk members each mounted for rotation by a respective one of said shafts, the relative position of said shafts and the size of said disk members being such that two of said disks substantially overlap a third one of said disks, each of said disk members having a surface bearing binary information in terms of concentric, arcuate, adjacent areas of relatively high and relatively low light reflectivity, the particular sequence and relative extent of said areas in relation to a substantially circular path intersecting a unique combination of said areas and commencing and terminating at a preselected reference point being indicative of the reading of said meter, a light beam source, means for scanning the combined nonoverlapped and overlapping portions of said areas with said beam along said preselected path thereby to generate a distinctive pattern of reflected light varying in intensity in digital fashion to form a train of signals indicative of the reading of said meter and means responsive to said reflected light for generating a corresponding train of electrical signals.

10. Apparatus in accordance with claim 9 wherein said scanning means includes dual function electric motor means for driving said scanning means and for generating a carrier wave in the form of electrical motor noise, and means for modulating said carrier wave with said electrical signals thereby to constitute an information signal suitable for transmission.

11. In a telemetering system apparatus for translating the angle of rotation of each of three meter driven shafts into an electrical signal indicative of the angle of rotation of said shafts and hence indicative of the reading of said meter comprising, in combination, three opaque disk members each mounted for rotation by a respective one of said shafts, the relative position of said shafts and the size of said disk members being such that two of said disks substantially overlap a third one of said disks, each of said disk members having a surface bearing binary information in terms of concentric, arcuate, adjacent areas of relatively high and relatively low light reflectivity, the particular sequence and relative extent of said areas in relation to a substantially circular path intersecting a unique combination of said areas and commencing and terminating at a preselected reference point being indicative of the reading of said meter, a light beam source, means for scanning the combined nonoverlapped and overlapping portions of said areas with said beam in a substantially circular path substantially concentric with respect to the overlapped one of said disks and substantially radial for at least a portion of its extent with respect to the overlapping ones of said disks, thereby to generate a distinctive pattern of reflected light varying in digital fashion to form a train of signals indicative of the reading of said meter, and means responsive to said reflected light for generating a corresponding train of electrical signals.

12. Apparatus in accordance with claim 11 wherein said scanning means includes dual function electric motor means for driving said scanning means and for generating a carrier wave in the form of electrical motor noise, and means for modulating said carrier wave with said electrical signals thereby to constitute an information signal suitable for transmission.

13. In a system for reading a meter from a distant control point wherein the reading of said meter is indicated by the rotary positions of a plurality of meter driven shafts, a plurality of opaque code disks each axially mounted for rotation by a respective one of said shafts, at least two of said disks substantially overlapping a third one of said disks, each of said disks having binary signal combinations on the face thereof in terms of concentric, arcuate, adjacent areas of relatively high and relatively low light reflectivity, means for directing a relatively narrow pencil-like light beam toward said disks, means including an electric motor operative from said control point for scanning the pattern formed by said areas with said beam in a single substantially circular path concentric with respect to said third disk and at least partially radial with respect to each of said two disks, thereby to generate a corresponding pattern of reflected light from said disks uniquely related to the position of rotation of each of said shafts, said motor, when operated, generating a relatively broad spectrum of electrical noise, a transistor comprising a base, an emitter and a control electrode, a photoresistive element positioned in the path of said reflected light, said element being connected in the emitter circuit of said transistor, means for applying said electrical noise between said base and collector electrodes, thereby generating an intelligence signal comprising said electrical noise as a carrier wave modulated in accordance with the pattern of resistance changes effected in said element by said reflected light, means for applying said intelligence signal to said remote point, and means at said remote point for translating said last named signal into a recorded meter reading.

14. In a system for reading a meter from a distant control point wherein the reading of said meter is expressed in terms of a hundreds, a tens and a units digit, each of said digits being indicated by the angle of rotation of a respective one of three meter driven shafts, each of said shafts having mounted thereon for rotation thereby a respective opaque code disk having binary signal combinations on the face thereof in terms of concentric, arcuate, adjacent areas of relatively high and relatively low light reflectivity, said code disk corresponding to said tens digit being centered between and substantially overlapped by the other two of said disks, a pencil-like light beam source, means including an electric electrical-noise producing motor operative from said control point for scanning said disks with said beam in a single substantially circular sweep, said sweep being substantially concentric with the overlapped one of said disks and at least partially radial with respect to the other two of said disks, thereby to generate a pattern of reflected light varying in intensity in accordance with the rotary position of said disks, a transistor including a base, an emitter and a collector electrode, a photoresistive element connected in the emitter circuit of said transistor and positioned in the path of said reflected light, means for biasing said transistor, means for applying the electrical noise from said motor between said base and collector electrodes whereby said noise is modulated in accordance with the pattern of resistance changes in said element effected by said reflected light, means for transmitting said electrical noise signal, as modulated, to said control point, and means at said control point for translating said noise signal as modulated into a meter reading.

15. Apparatus in accordance with claim 14 wherein said transmitting means includes a transformer having a primary and a secondary winding, a transmission line and an asymmetrically conducting impedance device, said primary winding being bridged between said collector electrode and a reference potential, said secondary winding being bridged between one terminal of said photoresistive element and one terminal of said impedance device, the free terminal of said impedance device being connected to said line and the free terminal of said photoresistive element being connected to said emitter electrode.

No references cited.